June 12, 1928.
B. N. BROIDO
1,673,390
WATER COOLED FURNACE WALL
Filed Nov. 26, 1924
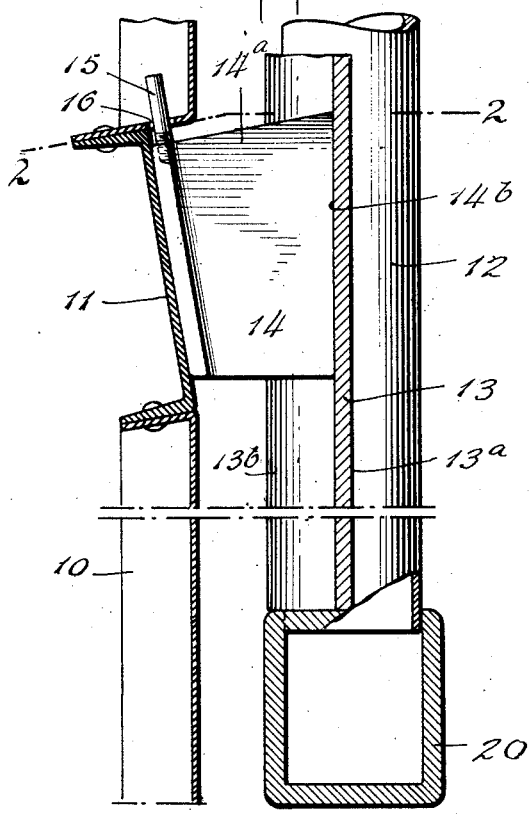
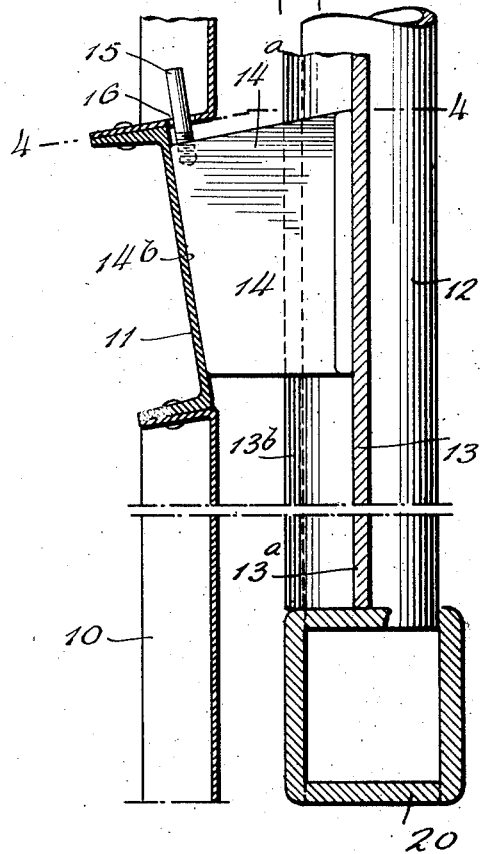
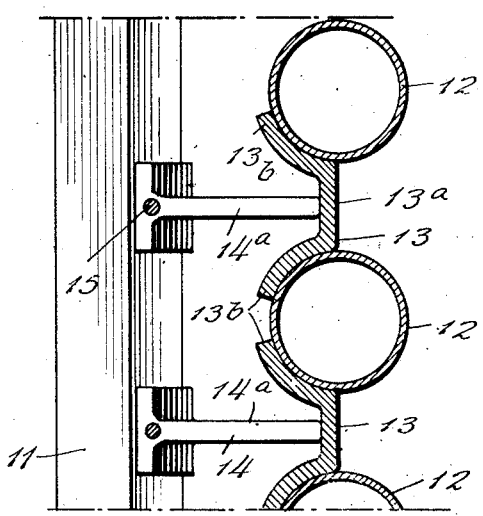
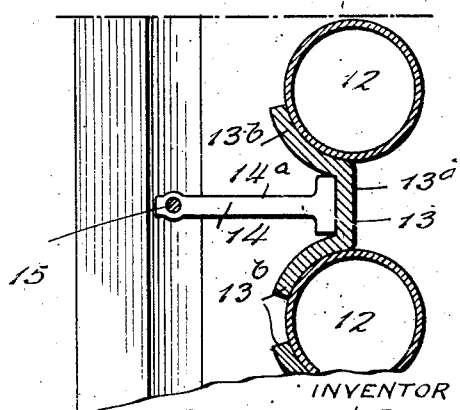
INVENTOR
BENJAMIN N. BROIDO
BY
Lotka, Diehlenbeck & Varle
ATTORNEYS Patented June 12, 1928.

1,673,390

UNITED STATES PATENT OFFICE.

BENJAMIN N. BROIDO, OF NEW YORK, N. Y., ASSIGNOR TO THE SUPERHEATER COMPANY, OF NEW YORK, N. Y., A CORPORATION OF DELAWARE.

WATER-COOLED FURNACE WALL.

Application filed November 26, 1924. Serial No. 752,374.

This invention relates to furnace walls, and while intended particularly for boiler furnaces, is applicable in other locations as well. The object of my invention is to obtain an efficient cooling of the wall by a durable construction which will not become encrusted easily, and which will utilize to a maximum extent the available heat for the heating of water. A further object is to provide a simple and inexpensive construction which will furnish a practically continuous protective heat absorbing surface, consisting of a plurality of parts which may be separately removed for replacement when necessary or desirable. Another object is to provide simple and effective means for insuring tight contact between the parts of the structure and to prevent warping thereof.

The furnace walls of boilers are frequently protected by water cooling, and such protection is used more and more in the case of large boilers. For this purpose the brick walls of the furnace have been provided either with water screens consisting of spaced tubes, or with water cooled walls forming continuous barriers between the brick wall and the combustion chamber. The first of these arrangements does not protect the brick wall fully, and allows it to become hot enough to allow slag to accumulate on the brick wall and between the tubes. The water cooled wall as generally constructed hitherto is efficient enough so far as its protective action is concerned, but lacks in heat-transferring capacity, so that in constructions where steam is to be generated within the tubes of the protective wall, less steam can be generated per square foot of surface than in constructions using a water screen such as referred to above.

By my improved construction, an example of which is described in detail hereinafter, I obtain very important advantages, which will be pointed out below.

Reference is to be had to the accompanying drawings, in which Fig. 1 is a vertical section through a furnace wall illustrating an example of a water cooled wall installation constructed in accordance with the principles of my invention; Fig. 2 is a horizontal section on the line 2—2 of Fig. 1; Figs. 3 and 4 are views similar to Figs. 1 and 2 showing a modified form.

As shown in the drawings the numeral 10 indicates a side wall of the combustion chamber of a boiler furnace, said wall being provided with the horizontally arranged, longitudinally extending channel beams 11, in accordance with the usual constructions of devices of this character. In the example of the installation illustrated, the water cooled wall includes a plurality of vertically extending tubes 12 through which water or other cooling medium is circulated. The tubes 12 extend preferably in spaced, substantially parallel relationship to each other and to the side wall 10, as clearly shown in the drawings. Extending across the space between each adjacent pair of tubes 12 is a bridging piece 13 having a flat central portion 13$^a$ and a pair of curved or socket-like side portions 13$^b$. The width of the central portion 13$^a$ and the length and curvature of the side portions 13$^b$ are such that each side portion is adapted to contact snugly with the side wall of its adjacent tube, along approximately one quarter of the circumference thereof. It will be understood that the bridging pieces extend along the entire length of the tubes, and as the entire space or opening between each pair of tubes is closed by a bridging piece, a continuous protecting wall is formed by such pieces and the tubes, thereby effectively preventing exposure of the walls 10 directly to the heat of the furnace and forming a large heat absorbing surface.

In order to obtain a sufficiently tight contacting engagement to insure the most efficient heat transference between the bridging pieces and tubes, and also to prevent undue warping of the bridging pieces I provide wedge members 14 for forcing and holding said pieces against the tubes. The wedge members preferably consist of short lengths of double angle or T iron, having the outer end of the central leg 14$^a$ planed or otherwise cut to provide the tapered or wedge face 14$^b$, the cross sectional dimensions of the T iron being such that the iron, when driven between the bridging pieces and the channel beams 11 of the wall, will wedge the bridging pieces tightly against the tubes.

As shown in Figs. 1 and 2 the tapered face 14$^b$ of the wedge member 14 is placed to contact with the central portion 13$^a$ of the bridging piece approximately along the longitudinal center thereof and a bolt or stud 15 is screwed into the wedge member preferably at the meeting point of the central and end webs or legs of the T iron. This bolt extends outwardly at an angle through an aperture 16 of the wall 10 and serves as a means to enable the wedge members to be driven downwardly and thereby force the bridging pieces tightly into contact with the tubes.

Figs. 3 and 4 illustrate a construction in which the wedging members 14 are placed with their tapered faces 14b in contact with the channel beams 11 instead of with the bridging pieces.

My invention offers the following valuable advantages: As a result of the curved construction of the socket portions of the bridging pieces, the large contact area thereof with the tubes, and the tight contact of the pieces with the tubes obtained by the use of the wedge members 14, efficient protection of the bridging pieces is insured, in addition the thickness of the metal of the bridging pieces is sufficient to secure a rapid conduction of the heat absorbed by the central portions 13a to the socket portions 13b of the tubes, which heat being transferred to the tubes will raise the temperature of the water passing therethrough so that I obtain a much greater effective heat absorbing area than heretofore obtained.

Furthermore, as the bridging pieces are not welded or otherwise secured to the tubes, or to each other, any one of the bridging pieces or tubes may be removed and replaced independently of the others; the space provided between the tubes and the wall permitting the easy removal of the bridging pieces through such space, while the tubes may be removed through the furnace.

While I have shown the wedging pieces as constructed of T iron it will be understood that any equivalent wedging devices may be employed. The bridging pieces may be constructed of cast iron or steel, or steel rolled to the desired cross sectional configuration.

It will be understood that headers such as indicated by the numeral 20, or other suitable connecting means will be employed at the top and bottom ends of the tubes 12.

Various modifications may be resorted to without departing from the principles of my invention.

I claim:

1. A protecting wall for heated structures comprising spaced tubes exposed on one side and adapted to contain a cooling fluid and bridging pieces of heat conductive material separate from said tubes and closing the spaces between them, to form with said tubes a continuous heat absorbing surface, each of said bridging pieces comprising a central web portion bridging the space between adjacent tubes, a pair of curved side portions the inner surfaces of which form sockets in which the rear portions only of said tubes are seated, and detachable means for forcing said sockets into close contact with said tubes.

2. A protecting wall for heated structures comprising spaced tubes adapted to contain a cooling fluid and bridging pieces of heat conductive material separate from said tubes and closing the spaces between them, each of said bridging pieces having a central web portion extending substantially diametrically of said tubes to bridge the space between the tubes of an adjacent pair, and form therewith a continuous heat absorbing surface, and said pieces further having a pair of curved side portions diverging laterally and rearwardly from said web portion, each of said side portions forming with a side portion of the adjacent bridging piece a semi-circular socket in which said tubes are seated, the contacting surface area of the said curved side portions of each bridging piece with the tubes being greater than the surface area of that side of the central web portion exposed to the heat source, and detachable means to press said bridging pieces into tight contacting engagement with said tubes.

3. In combination with a wall to be protected, spaced tubes located on that side of said wall which is to be protected, and bridging pieces each having a central portion bridging the space between adjacent tubes, and socket portions in which said tubes are seated, said socket portions extending from said central portions around said tubes toward the said wall, and having their edges between said tubes and said wall, and wedge members in contact with said wall and bridging pieces to hold said pieces tightly in contact with said tubes.

4. In combination with a wall to be protected, spaced tubes located on that side of said wall which is to be protected, and bridging pieces each having a central portion bridging the space between adjacent tubes, and socket portions in which said tubes are seated, said socket portions extending from said central portions around said tubes toward the said wall, and having their edges between said tubes and said wall, and wedge members in contact with said wall and bridging pieces to hold said pieces tightly in contact with said tubes, said wedge members having a projection rigid therewith and extending through said wall to serve as a means for enabling said members to be wedged tightly between said wall and bridging pieces.

5. The combination with a wall to be protected having channel irons extending longitudinally thereof, of a plurality of spaced tubes located on that side of said wall which is to be protected, bridging pieces extending across the spaces between said tubes, said bridging pieces having portions thereof, in contacting engagement with, but unsecured to, said tubes, and wedging members in contact with said channel irons and bridging pieces to hold said portions of said pieces tightly in contact with said tubes.

6. The combination with a wall to be protected having channel irons extending longitudinally thereof, of a plurality of spaced tubes located on that side of said wall which is to be protected, bridging pieces extending across the spaces between said tubes, said bridging pieces having portions thereof, in contacting engagement with, but unsecured to, said tubes, and wedging members in contact with said channel irons and bridging pieces to hold said portions of said pieces tightly in contact with said tubes, said wedging members being provided with a rigid projection extending through said wall to serve as a means for enabling said members to be driven into wedging engagement from the outer side of said wall.

In testimony whereof I have hereunto set my hand.

BENJAMIN N. BROIDO.